(12) United States Patent
Garcia et al.

(10) Patent No.: US 8,892,775 B2
(45) Date of Patent: Nov. 18, 2014

(54) APPARATUS, SYSTEM, AND METHOD FOR REDUNDANT DEVICE MANAGEMENT

(75) Inventors: Enrique Q. Garcia, Tucson, AZ (US); Yvonne H. Kleppel, Wappingers Falls, NY (US); Kenny N. Qiu, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 822 days.

(21) Appl. No.: 12/127,538

(22) Filed: May 27, 2008

(65) Prior Publication Data

US 2009/0300216 A1    Dec. 3, 2009

(51) Int. Cl.
| | | |
|---|---|---|
| G06F 15/16 | (2006.01) | |
| H04L 12/26 | (2006.01) | |
| G06Q 10/00 | (2012.01) | |
| H04L 12/10 | (2006.01) | |
| H04L 12/24 | (2006.01) | |

(52) U.S. Cl.
CPC ............ *H04L 12/10* (2013.01); *H04L 43/0817* (2013.01); *G06Q 10/00* (2013.01); *H04L 12/24* (2013.01)
USPC .......................................................... 709/245

(58) Field of Classification Search
CPC ......... G06F 13/374; G06F 1/26; G06F 1/263; G06F 1/266; G06F 1/28; H04L 12/433; H04L 12/10
USPC ............................. 709/245; 700/287; 713/300
See application file for complete search history.

(56) References Cited

U.S. PATENT DOCUMENTS

| | | | | |
|---|---|---|---|---|
| 4,482,999 | A * | 11/1984 | Janson et al. ................. | 370/452 |
| 4,567,590 | A * | 1/1986 | Bederman ..................... | 370/452 |
| 4,982,185 | A * | 1/1991 | Holmberg et al. ........ | 340/825.21 |
| 5,319,571 | A | 6/1994 | Langer et al. | |
| 5,551,053 | A | 8/1996 | Nadolski et al. | |
| 5,781,549 | A | 7/1998 | Dai | |
| 5,833,375 | A * | 11/1998 | Gauthier et al. ............... | 400/82 |
| 5,951,661 | A | 9/1999 | Tavallaci et al. | |
| 5,974,351 | A * | 10/1999 | Croft et al. ...................... | 701/48 |
| 5,982,652 | A | 11/1999 | Simonelli et al. | |
| 5,990,638 | A | 11/1999 | Aoyama et al. | |
| 6,041,414 | A | 3/2000 | Kikuchi | |
| 6,438,647 | B1 | 8/2002 | Nielson et al. | |
| 6,629,247 | B1 * | 9/2003 | Hall et al. ..................... | 713/300 |
| 6,810,442 | B1 | 10/2004 | Lin et al. | |
| 6,954,704 | B2 | 10/2005 | Minami et al. | |
| 7,165,005 | B2 | 1/2007 | Steger et al. | |
| 7,529,253 | B2 * | 5/2009 | Lee et al. ....................... | 370/400 |
| 7,533,159 | B1 * | 5/2009 | Jones ............................ | 709/220 |
| 2002/0027495 | A1 * | 3/2002 | Darby et al. .................. | 340/298 |

(Continued)

Primary Examiner — Krista Zele
Assistant Examiner — James Forman
(74) Attorney, Agent, or Firm — Kunzler Law Group

(57) ABSTRACT

An apparatus, system, and method are disclosed for redundant device management. The apparatus is provided with a plurality of modules configured to functionally execute the necessary steps of receiving a communication message, determining whether an address associated with the communication message designates a local processor as a destination for the communication message, wherein the address is stored in an address field associated with the communication message, and transmitting the communication message to a remote device. These modules in the described embodiments include a transmitter module, a receiver module, and an addressing module.

20 Claims, 8 Drawing Sheets

(56) References Cited

U.S. PATENT DOCUMENTS

| | | | |
|---|---|---|---|
| 2003/0033550 A1* | 2/2003 | Kuiawa et al. | 713/340 |
| 2004/0010349 A1* | 1/2004 | Perez et al. | 700/287 |
| 2005/0182511 A1* | 8/2005 | Bader et al. | 700/220 |
| 2007/0016312 A1* | 1/2007 | Redmond et al. | 700/22 |
| 2007/0210652 A1* | 9/2007 | Tracy et al. | 307/66 |
| 2008/0133955 A1* | 6/2008 | Westerfield et al. | 713/340 |
| 2009/0009001 A1* | 1/2009 | Marwali et al. | 307/65 |
| 2009/0063709 A1* | 3/2009 | Rice et al. | 710/1 |

* cited by examiner

APPARATUS, SYSTEM, AND METHOD FOR REDUNDANT DEVICE MANAGEMENT

BACKGROUND OF THE INVENTION

1. Field of the Invention

This invention relates to electronic device management and more particularly relates to redundant device management.

2. Description of the Related Art

Electronic device monitoring and management is a common task in a computing environment. The reliability of such computing systems is critical because of the potential financial impact that may accompany a device failure. Additionally, such computing systems are often very dynamic, with devices being installed and removed often. Management of addressing information in such systems may be an arduous task. For example, if a device is added to a common computing system, the system administrator must obtain certain addressing and configuration information, such as a Media Access Control (MAC) address, an Internet Protocol (IP) address, a Domain Name Service (DNS) name, and the like, in order to configure the monitoring and management system to communicate with the newly installed device.

One such system requiring device management is a network of managed Uninterruptible Power Supply (UPS) devices. A typical UPS device includes a battery that provides power to an electronic device in the event of a power outage. Typical UPS devices are capable of powering an electronic device for several minutes on battery power alone. In general, the UPS device detects the power outage and applies battery power to the electronic device before the power outage is perceived by the electronic device. Certain UPS devices also include software applications configured to backup data stored on the electronic device, and shut down the electronic device in response to detecting a power outage. Thus, UPS devices are generally configurable to perform certain custom operations in addition to providing battery power in response to a detected power outage.

In general, there are two main types of UPS devices. The first type is a Standby Power System (SPS). An SPS monitors the power line and switches to battery power as soon as it detects a power outage on the line. The switch to battery power generally requires several milliseconds. The electronic device may not receive power during the switch period. This outage may be perceived by certain highly sensitive systems. Standby Power Systems are sometimes called Line-interactive UPSes.

The second type is an on-line UPS. The on-line UPS avoids power lapses by constantly providing power from its own inverter, even when the power line is functioning properly. Thus, an on-line UPS does not require any switching mechanism for applying battery power, and the conversion from line power to battery power is unperceivable by the electronic device. In general, an on-line UPS is more expensive than an SPS. Consequently, on-line UPS devices are typically employed in mission critical computing systems.

In general, the UPS devices provide power to computing or networking devices. UPS devices are most prevalent in business environments, where reliability of data stored on computing devices and consistent access to that data is critical for business activities. For example, UPS devices are typically used to power application servers, network routers, and shared enclosures for data disks or computing peripherals.

In such systems, UPS devices are commonly monitored and managed by a UPS management device. The UPS management device generally monitors the status of the UPS device. Additionally, the UPS management device commonly communicates configuration data to the UPS device. In typical systems, the UPS management device communicates with the UPS device over Ethernet connections using TCP/IP protocols or through individual discrete cables connected directly between the UPS management device and the UPS device.

SUMMARY OF THE INVENTION

The present invention has been developed in response to the present state of the art, and in particular, in response to the problems and needs in the art that have not yet been fully solved by currently available device management systems. Accordingly, the present invention has been developed to provide an apparatus, system, and method for redundant device management that overcome many or all of the above-discussed shortcomings in the art.

The apparatus is provided with a plurality of modules configured to functionally execute the necessary steps of receiving a communication message, determining whether an address associated with the communication message designates a local processor as a destination for the communication message, wherein the address is stored in an address field associated with the communication message, and transmitting the communication message to a remote device. These modules in the described embodiments include a transmitter module, a receiver module, and an addressing module.

In a further embodiment, the addressing module determines a type for the communication message received by the receiver module based on a type value in a message type field associated with the communication message. The addressing module may also determine a portion of the communication message designated for the local processor in response to the address in the address field and the type value in the message type field.

In one embodiment, the local processor retrieves a message payload from a message body portion of the communication message designated for the local processor in response to the addressing module determining that the type associated with the communication message is a standard message type and that the local processor is the destination for the communication message. The local processor may also retrieve a message payload from a designated sub-portion of a message body portion of the communication message in response to the addressing module determining that the type associated with the communication message is a broadcast message type, wherein the designated sub-portion of the message body portion of the communication message is determined by the addressing module in response to the address.

The local processor may generate a message payload and inject the message payload into a designated sub-portion of the message body portion of the communication message in response to the addressing module determining that the type associated with the communication message is a poll message type, wherein the designated sub-portion of the message body portion of the communication message is determined by the addressing module in response to the address. Additionally, the transmitter module may transmit the communication message with a default value in the designated sub-portion of the message body portion of the communication message in response to the addressing module determining that the type associated with the communication message is a poll message type, and in response to the local processor failing to inject the message payload into the designated sub-portion of the message body portion of the communication message within a predetermined period of time.

In a further embodiment, the addressing module modifies the address to designate an address value that designates the remote device in association with the transmitter module transmitting the communication message to the remote device.

A system of the present invention is also presented. In one embodiment, the system may include a device manager and one or more chains of managed devices. The managed device may include a receiver module, a transmitter module, and an addressing module. In one embodiment, the receiver module receives a communication message. The transmitter module transmits the communication message to a remote device. The addressing module determines whether an address associated with the communication message designates a local processor as a destination for the communication message, wherein the address is stored in an address field associated with the communication message The device manager may include a transmitter module, a receiver module, and a processing module. In one embodiment, the transmitter module transmits communication message to a first managed device in the chain of one or more managed devices. The receiver module receives a response message from the first managed device. The processing module generates the communication message and processes the response message, wherein the communication message and the response message further comprise an address field, wherein a value of the address field associates a portion of the communication message with the managed device, and wherein the value of the address field associates a portion of the response message with the managed device.

A method of the present invention is also presented. The method in the disclosed embodiments substantially includes the steps necessary to carry out the functions presented above with respect to the operation of the described apparatus and system. In one embodiment, the method includes receiving a communication message, determining whether an address associated with the communication message designates a local processor as a destination for the communication message, wherein the address is stored in an address field associated with the communication message, and transmitting the communication message to a remote device.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
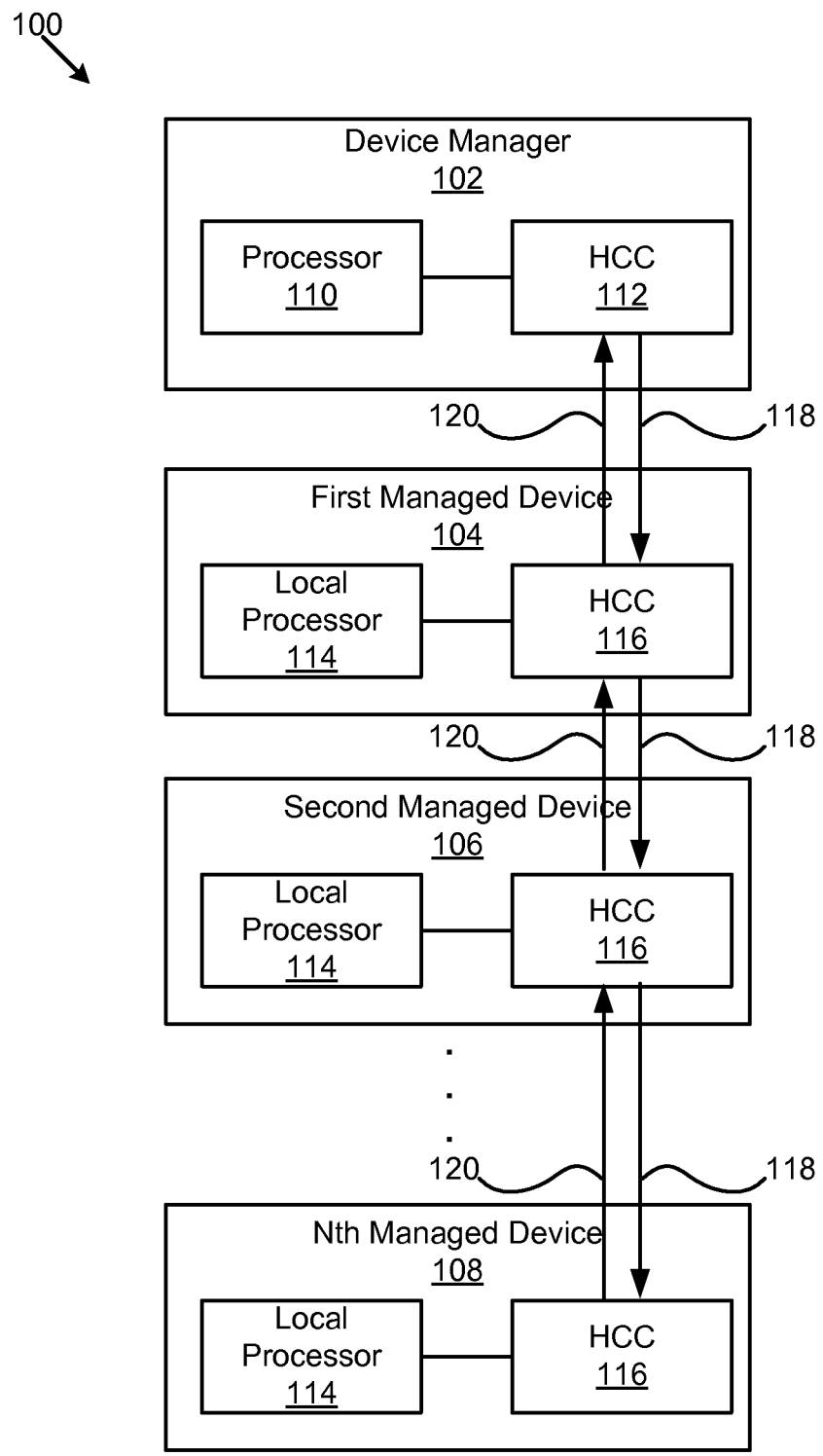
FIG. 1 is a schematic block diagram illustrating one embodiment of a system for redundant device management.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may include a computer program product comprising computer executable code. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts one embodiment of a system 100 for management of a chain of devices. The chain may include a first managed device 104 and a second managed device 106. In a further embodiment, the device chain may be expandable up to an Nth managed device 108. The system 100 may also include a device manager 102 configured to manage the managed devices 104-108 in the device chain. The system may also include a communication cable comprising at least one up-link 120 and at least one down-link 118. In a specific embodiment, the cable may include an RS-485 compatible cable capable of communicating RS-485 communication messages between the managed devices 104-108 and between the first managed device 104 and the device manager 102.

In a further embodiment, the device manager 102 may include a processor 110 and a hardware communication card 112 configured to communicate with a hardware communication card 116 of the first managed device 104. The Device manager 102 may establish a master/slave relationship with the managed devices 104-108. Additionally, each managed device 104-108 may include a local processor 114 and a hardware communication card 116. In such an embodiment, the hardware communication cards 112, 116 may include a Field Programmable Gate Array (FPGA) or the like.

In such an embodiment, the hardware communication cards 112, 116 may operate in a quasi-independent state. Specifically, the hardware communication cards 112, 116 may communicate upstream communication messages over the upstream communication link 120 and downstream communication messages over the downstream communication link 118 independently of the processor 110, 114. The benefit of such a configuration is that the device manager 102 can communicate with all of the managed devices 104-108 in the network, even when one of the managed devices has failed or experienced an error.

The upstream communication message and the downstream communication messages are two distinct embodiments of a communication message that the managed devices 104-108 may receive from and transmit to a remote device. For example, the first managed device 104 may receive a downstream communication from the device manager 102. The first managed device 104 may also transmit an upstream communication message to the device manager 104. In such an embodiment, the device manager 102 is a remote device with reference to the first managed device 104.

The hardware communication cards 112, 116 may operate in a quasi-independent state. For example, they may pass communications from one device to another independently of the processor 110, 114. The processor 110, 114 is responsible for generating and processing device specific messages.

For example, when the entire chain is functioning properly, the device manager 102 transmits a downstream status query message to the first managed device 104. The first managed device 104 will receive the status query message and pass the content of a portion of the downstream message intended for the first managed device 104 to the local processor 114. In a further embodiment, the managed device 104 may increment a value in an address field, where the address field is configured to indicate a sub-portion of the downstream communication message designated for the first managed device 104. Upon incrementing the address field, the address field may designate a second sub-portion of the downstream communication message associated with the second managed device 106. The hardware communication card 116 will then continue to pass the status query message downstream to the second managed device 106, and so on until the Nth managed device 108 has received the downstream status query message.

The Nth managed device 108 may determine that it is the last managed device in the chain, and prepare to generate an upstream status response message. The local processor 114 of the Nth managed device 108 may generate the upstream status response message by injecting a status message in an Nth portion of a 1024 bit upstream status response message. The Nth portion may be designated by an address field associated with the upstream communication message. The local processor 114 may communicate the upstream status response message to the hardware communication card 116, which transmits the upstream status response message to the preceding managed device (in this example, the second managed device 106) in the chain.

In a further embodiment, the communication message may include a header portion, message body portion, and a trailer portion. The address field may be located in the header portion. The header portion may also include a message type field. The message type field may include a value that identifies a message as a "poll type," a "standard type," or a "broadcast type." The body portion may be divided into 128 eight bit sub-portions, or alternatively, the body portion may include a single 1024 bit portion. In one embodiment, the trailer portion may include a field for Cyclic Redundancy Check (CRC) data used to verify the content of the communication message as it passes from one device to the next.

As used herein, the term "poll type" means a message transmitted by the device manager 102 to the managed device 104 for the purpose of obtaining a response message. In one embodiment, the response message may include status information or configuration information relating to the operational characteristics of the managed device at that time. As used herein, the term "broadcast type" means a message that contains information which is intended to be communicated to all of the managed devices 104-108 in the network. In one embodiment, the broadcast type message may include separate blocks of information, each block of information designated for an individual managed device 104 based on a value in the address field. As used herein, the term "standard message" means a communication message which is directed toward only a single managed device 104-108 within the network. For example, device manager 102 may send a standard message containing a 1024 bit message payload that is injected into the message body to the second managed device 106 only. In such an embodiment, the message type field would indicate "standard type" using a predetermined ascii character, and the value of the address field would designate that only the second managed device 106 should retrieve the message payload.

The hardware communication card 116 of the second managed device 106 may then receive the upstream status response message from the Nth managed device 108, and check for a status message from the local processor 114 to inject into the second position within the 1024 bit upstream status response message. The second managed device 106 sends the upstream status response message to the first managed device, which follows the same process and finally sends the upstream status response to the device manager 102. The device manager 102 may then receive the upstream status response message and communicate its content to the processor 110. The processor 110 may then process the content of the upstream status response message to determine a status of the network.

However, consider hypothetically that the second managed device 106 is not functioning properly because the local processor 114 has failed. Since the hardware communication card 116 operates quasi-independently of the local processor 114, it may still communicate the downstream status query message to the Nth managed device 108, and the upstream status response message to the first managed device 104. However, when the hardware communication card 116 of the second managed device 106 checks for a local status response message from the local processor 114, it will not find one because the local processor 114 has failed. In such an example, the hardware communication card 116 may leave the second position within the 1024 bit status response message blank, and pass it on. In this example, the processor 110 of the device manager 102 may identify a problem with the second managed device 106, because the second position within the 1024 bit status response message is blank.

In one embodiment, the UPS devices may be chained serially in independent strings of from one to 128 units in length. The hardware communication card 116 of such devices may include an FPGA based hardware controller configured to initiate and manage low level (transport layer) communication with multiple of managed devices 104-108 via a network of RS-485 serial interfaces. The communication fabric may consist of dedicated, point to point, full duplex RS-485 links 118, 120. The transport layer may be implemented entirely in FPGA hardware and not directly visible to firmware on the local processor 114. In one embodiment, the processor 110, 114 is a microprocessor.

The device manager 102 may support multiple independent hardware communication cards 112 for attachment of multiple strings of managed devices 104-108. The managed devices 104-108 may each support a connection to two fully independent and redundant networks 100.

In one embodiment, high level communication may be between the firmware on the microprocessor 110 in the master mode and the firmware in the local processor 114 in each of the managed device 104-108. Essentially, firmware on the local processor 110 of the managed devices may deposit an ASCII message in a specific format and then wait for an ASCII response message of specific format to be returned from local processor 114 on one or more of the slave managed devices 104-108. One of ordinary skill in the art may recognize that the content of the upstream and downstream communication messages could vary widely depending on the requirements of the system 100.

Figure 2:
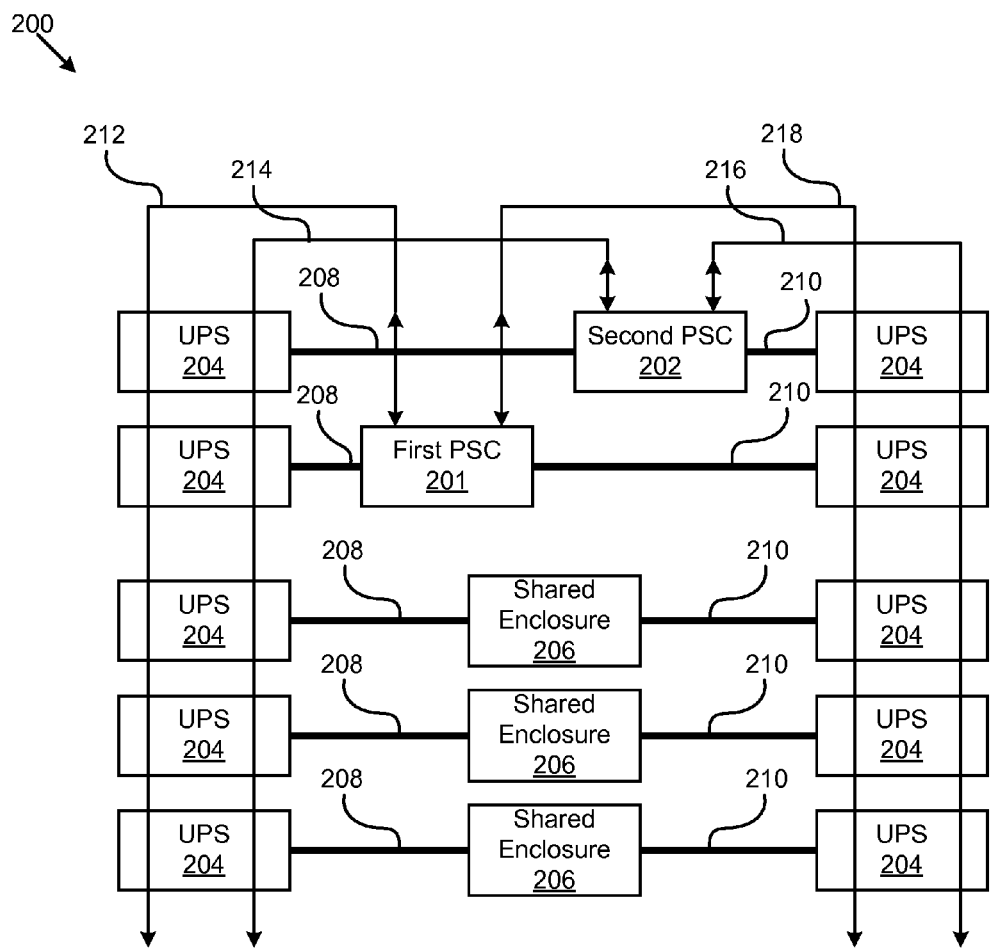
FIG. 2 is a schematic block diagram illustrating one embodiment of a system for redundant management of a UPS network.

FIG. 2 illustrates a further embodiment of a system 200 for redundant device management. In this embodiment, the system 200 includes a network of UPS devices 204 managed redundantly by a first PSC 201 and a second PSC 202. The first PSC 201 and the second PSC 202 may operate substantially as described above with reference to the first PSC 201 in FIG. 1. In a further embodiment, both the first PSC 201 and the second PSC 202 may include multiple communication ports, for managing multiple UPS chains simultaneously. In such an embodiment, the two PSC devices 201, 202 may redundantly manage two separate UPS chains.

FIG. 2 further illustrates an operational environment of the PSC devices 201, 202. In this system 200, a first PSC device 201, the second PSC device 202 and one or more powered devices (e.g., shared enclosures 206) may be redundantly powered by two separate UPS devices 204. For example, the shared enclosure 206 may be powered by a first managed device 204 from a first managed device chain on a first power connection 208 and a second managed device 204 from a second managed device chain on a second power connection 210.

The two UPS chains may be redundantly managed. For example, the first PSC device 201 may include a first RS-485 connection 212 to the first managed device chain and a second RS-485 connection 218 to the second managed device chain. The second PSC device 202 may also include a first RS-485 connection 214 to the first managed device chain and a second RS-485 connection 216 to the second managed device chain. Thus, the second PSC device 202 may take over management of the UPS networks if the first PSC device 201 fails.

As depicted two strings of UPS units 204 may utilize redundant full duplex RS-485 serial connections to communicate with two independent PSC systems 102, 202. Individual UPS units in a string may also be chained together using separate and redundant serial links 118, 120 as shown in FIG. 1. Essentially each PSC device 201, 202 may have a redundant control network for each independent string of UPS units 204.

Figure 3:
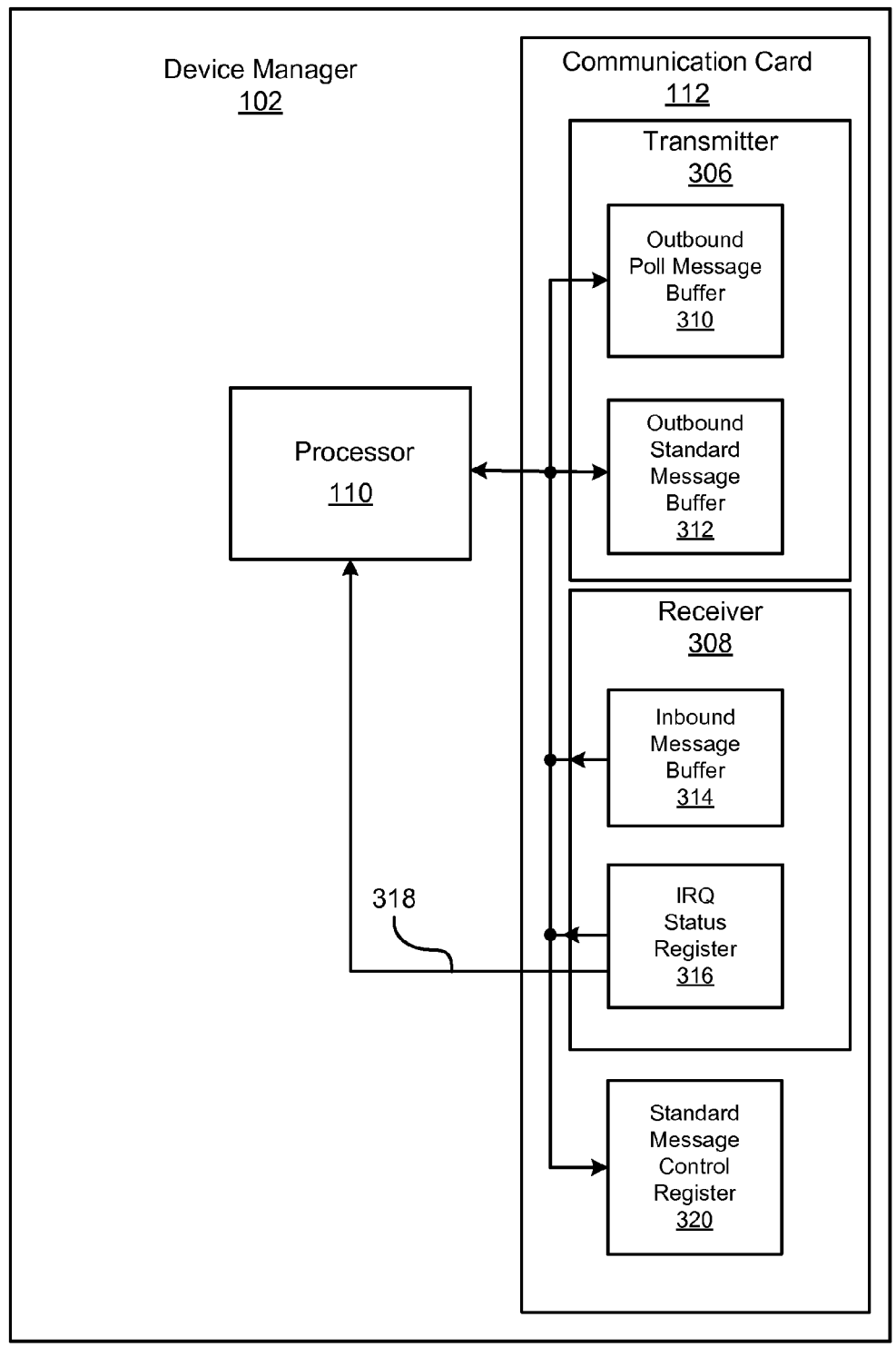
FIG. 3 is a schematic block diagram illustrating one embodiment of an apparatus for redundant device management.

FIG. 3 illustrates one embodiment of an apparatus for redundant device management. In one embodiment, the apparatus is a device manager 102. In a further embodiment, the device manager 102 may be a PSC device 201. As described above in FIG. 1, the device manager 102 may include a processing module 110 and a hardware communication card 112. In a further embodiment, the processing module 110 may include a configuration module (not shown) and a status module (not shown). The hardware communication card 112 may also include a transmitter module 306, and a receiver module 308.

For illustrative purposes, the device manager 102 will be described in the context of a UPS network 200. Specifically, the device manager 102 is described as a PSC device 201. This comparison is for descriptive purposes only, and it is not intended that the device manager 102 should be construed or limited in any way so as to restrict its application to the described embodiment only. Indeed, various alternative embodiments of the device manager 102 are envisaged, including but not limited to, a hard disk array manager, a server manager, a network router monitory, and the like. In one embodiment, the processing module 110 may generate a downstream communication message which the transmitter module 306 may transmit to a first managed device 104 in a chain of UPS devices 204. In a further embodiment, the receiver module 308 may communicate an upstream response message received by the receiver module 308 from the first managed device 104 to the processing module 110.

In a further embodiment. The transmitter module 306 may include an outbound poll message buffer 310 and an outbound standard message buffer 312. The receiver module 308 may also include an inbound message buffer 314 and an IRQ status register 316 with an IRQ status connection 318 to the processing module 110. The hardware communication card 112 may also include a standard message control register 320. The transport layer may deliver the content of each the outbound message buffers 310, 312 and store the corresponding message responses in the inbound message buffer 314. The messages may be encoded in standard ASCII character format.

The poll message buffer 310 may be automatically, periodically, and unconditionally transported or re-transported to the UPS devices 204 by the hardware transport layer either every 200 ms or 400 ms. The poll message buffer 310 may hold a separate eight ASCII character message destined for each of the 128 UPS devices 204 (1024 ASCII characters total). The corresponding message response, stored in the inbound message buffer 314, holds a separate eight ASCII character message response received for each of up to 128 UPS devices 204 (1024 ASCII characters total). When a response to a poll message is received, an IRQ status register 316 (IRQS) bit indicating poll message complete is set and an IRQ is asserted to the processing module 110 on the IRQ status connection 318. This facility may provide for reliable and timely exchange of basic UPS control (e.g., on/off/connect), and UPS status (e.g., fault/on battery) information.

The standard message buffer 312 may hold a single 1024 ASCII character message which can be either targeted to a specific UPS device 204 or broadcast to all UPS devices 204. In one embodiment, standard messages may be queued for delivery only when the Standard Message Control Register (SMCR) 320 is written by the processing module 110. When the SMCR 320 is written with a binary equivalent value from 0 to 127, the message is queued for targeted delivery to the specific corresponding UPS device 204. In another embodiment, when the SMCR 320 is written with any other value the message is queued for broadcast to all UPS devices 204. For example, if the standard message was targeted to a specific UPS device 204 then the corresponding message response, stored in the inbound message buffer 314, may hold a single 1024 ASCII character message response received from the specific targeted UPS device 204. Alternatively, if the standard message was broadcast to all UPS devices 204 then the corresponding message response, stored in the inbound message buffer 314, holds a separate eight ASCII character message response received for each of the 128 UPS devices 204 (1024 ASCII characters total). When a response to a standard message is received an IRQ status register 316 (IRQS) bit indicating standard message complete is set and an IRQ is asserted to the microprocessor. The intent of this facility is primarily for exchange of less urgent information (e.g., read VPD, download code, etc.) with a specific UPS device 204 or with all UPS devices 204.

The hardware transport layer may automatically exchange a complete message every 200 ms. In one embodiment, every other message transaction is unconditionally enforced by the hardware to be a poll message exchange. In a further embodiment, if a standard message has been queued by a write to the SMCR 320 register it may be exchanged by the transport layer as soon as possible subject to the above limitation.

In a particular embodiment, an outbound message buffer 310, 312 may only be written within a 48 ms window following the assertion of any message complete IRQS bit. Writes to any outbound message buffer 310, 312 outside of this window may be discarded, and an outbound buffer write exception bit may be set in IRQS, and an IRQ is asserted to the processing module 110. In a further embodiment, the inbound message buffer 314 may only be read within a 48 ms window following the assertion of any message complete IRQS bit. Reads from the inbound message buffer 314 outside of this window may return "ESC" ASCII characters.

In a further embodiment, the outbound poll message buffer 310 may be initialized with "SPACE" ASCII characters following a power on or hardware reset. This may imply that "SPACE" poll messages may be transacted every 200 ms until the outbound poll message buffer 310 is first loaded by the processing module 110.

In one embodiment, the lowest address in the outbound poll message buffer 310 points to the first character to be transmitted to the first (nearest) managed device 104 in the string. In another embodiment, the lowest address in the outbound standard message buffer 312 points to the first character to be transmitted to a targeted UPS unit 204 or to all UPS units 204 as applicable. For poll and broadcast message responses the lowest address in the buffer 310, 312 may point to the first character received from the first managed device 104 in the string.

ASCII "SPACE" characters may be the hardware generated default message response for a UPS device 204 whose hardware is off-line (e.g.—broken/missing). ASCII "NAK" characters may be the hardware generated default message response from a UPS device 204 whose firmware is off-line (e.g., dead processing unit 114).

In a further embodiment, the configuration module (not shown) may detect a configuration of a UPS chain in response to the upstream communication message received from the UPS devices 204. For example, if an additional UPS device 204 is added to the chain, the configuration module (not shown) may determine that it has been added to the network and automatically begin sending poll messages and configuration messages to the new UPS device 204.

The status module (not shown) may determine a status of the UPS devices 204 within a chain based on the content of the upstream communication message received from the chain. For example, if one portion of an inbound status message is all "SPACE" characters, the status module (not shown) may determine that the UPS device 204 at that location in the string has failed. In a further embodiment, the status module (not shown) may provide some indicia of the failure to a system administrator, such as sounding an alarm or displaying an alert. In a further embodiment, the status module (not shown) or the processing module 110 may send a restart command to the failed UPS device 204, or the like.

Figure 4:
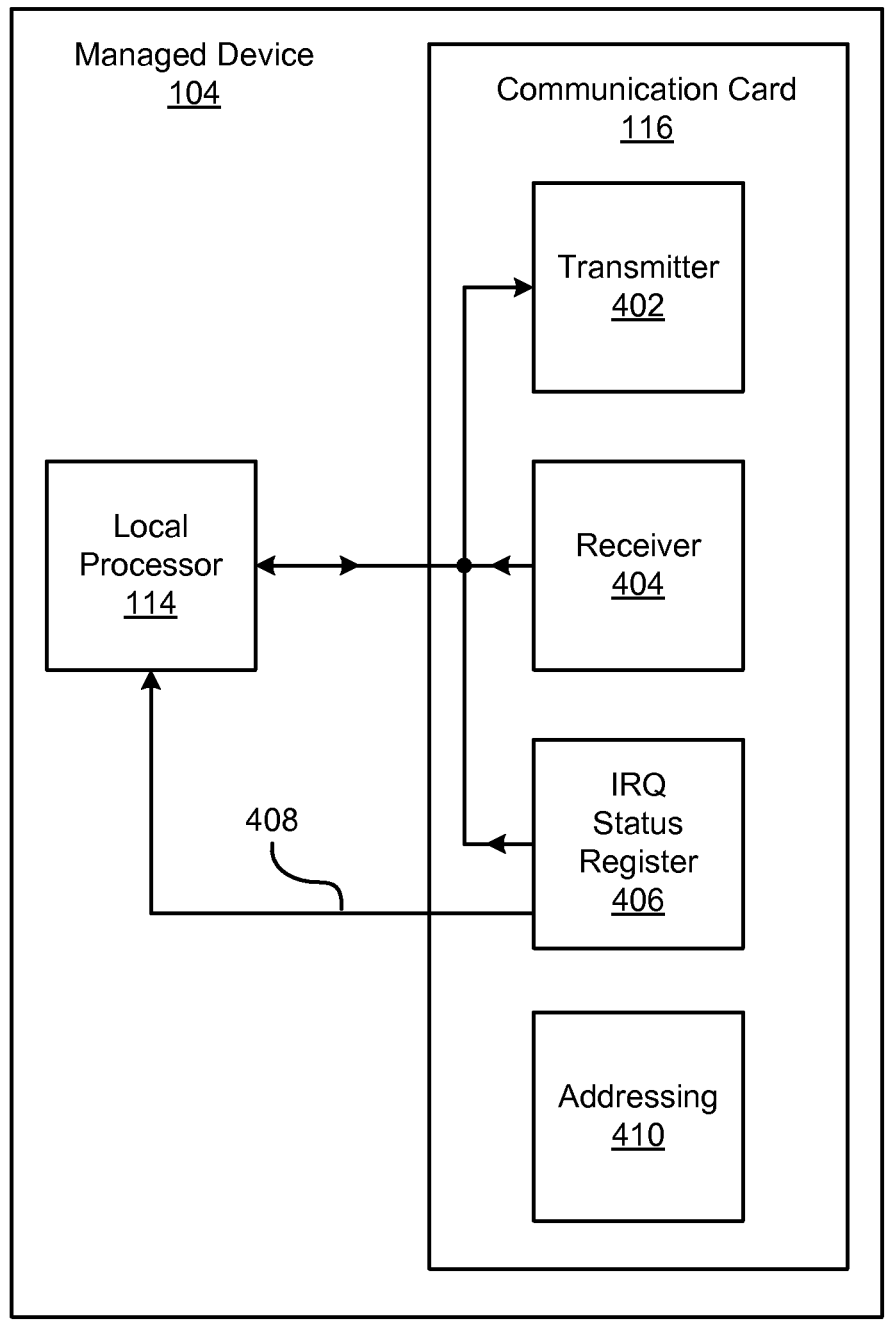
FIG. 4 is a schematic block diagram illustrating another embodiment of an apparatus for redundant device management.

FIG. 4 illustrates another embodiment of an apparatus for redundant device management. In this embodiment, the apparatus is a managed device 104. The managed device 104 may include a local processor 114 and a hardware communication card 116. In the depicted embodiment, the local processor 114 may include a microprocessor configured to run firmware instructions. The hardware communication card 116 may include a transmitter module 402 and a receiver module 404. In a further embodiment, the hardware communication card 116 may include an IRQ status register 406.

In such an embodiment, the local processor 114 may generate a payload for an upstream communication message and process a payload received from a downstream communication message. As described above, the upstream communication message and the downstream communication message may include a 1024 bit data packet. In an alternative embodiment, the data packet may include characters rather than bits. However, only a portion of that 1024 bit data packet may be intended for each of the UPS devices 204.

In a particular embodiment, only 8 characters of the 1024 character data packet are intended for each managed device 104. In such an embodiment, the payload is the 8 bit message to be injected in a predetermined location within the 1024 bit data packet. For example, the first managed device 104 may inject an 8 bit payload message in the first position, or first 8 bits, of the 1024 bit data packet. The second managed device 106 may inject a second 8 bit payload message in the second position or second set of 8 bits in the 1024 bit data packet, and so on until the Nth managed device 108 injects its payload message in the Nth position within the 1024 bit data packet. In such an embodiment, the UPS device chain may be expanded to up to 128 managed device 104.

In one embodiment, the receiver module 404 may receive an upstream or downstream communication message from another managed device 104 or the PSC device 201. The receiver module 404 may then extract the payload from the communication message and place it in an inbound buffer. The transmitter module 402 may then regenerate the communication message and check an outbound message buffer for a payload to inject. The transmitter module 402 may then transmit the communication message to the next managed device 104 in the chain, or to the device manager 102 if it is the first managed device 104 in a chain.

The managed device 104 may automatically and repetitively receive one of three types of messages—poll, standard, or broadcast every 200 ms. In such an embodiment, when the transport layer receives a valid message it may set an IRQ status register 406 (IRQS) bit corresponding to the type of message received and an IRQ 408 may be asserted to the local processor 114.

In a further embodiment, when a message is received, local processor 114 may have a 48 ms window to both read (pop) the message from inbound message First In First Out (FIFO) message buffer, and to write (push) a message response into the outbound message FIFO. The receiver module 404 may include an inbound FIFO and the transmitter module 402 may include an outbound FIFO. The size of the inbound and outbound messages may depend on the type of message that is received. For example, reads from the inbound message FIFO outside of this window may return "ESC" ASCII characters. Similarly, writes to the outbound message FIFO outside of this window may be discarded, and an outbound FIFO write exception bit may be set in IRQS, and an IRQ is asserted to the local processor 114. In a specific embodiment, the local processor 114 may validate the outbound message FIFO within a 48 ms window.

In a similar embodiment, the local processor 114 may read eight ASCII characters from the inbound message FIFO and write eight ASCII characters into the outbound message FIFO within the 48 ms window when a poll message is received. In another embodiment, the local processor 114 may read 1024 ASCII characters from the inbound message FIFO and write 1024 ASCII characters into the outbound message FIFO within the 48 ms window when a targeted message is received. When a broadcast message is received, the local processor 114 may read 1024 ASCII characters from the inbound message FIFO and write eight ASCII characters into the outbound message FIFO within the 48 ms window.

In a further embodiment, the managed device 104 may include an addressing module 410 coupled to the processing module 114. The addressing module 410 may determine a sub-portion of the upstream communication message 120 and the downstream communication message 118 associated the managed device 104, and to modify an address field associated with the upstream communication message 120 and the downstream communication message 118, wherein the modification designates a subsequent managed device 104 in the chain. For example, the addressing module 410 of the first managed device 104 may increment the addressing field before transmitting the downstream communication message 118 to the second managed device 106. Similarly, the second managed device 106 may modify the address field of an upstream communication message 120 before transmitting the upstream communication message 120 to the first managed device 104. Thus, the addressing module 410 modifies the value in the address field to designate an address value that designates the remote device in association with the transmitter module 402 transmitting the communication message to the remote device.

Additionally, the addressing module 410 may determine a type for the communication message received by the receiver module 404 based on a type value in a message type field associated with the communication message. The addressing module 410 may also determine a portion of the communication message designated for the local processor 114 in response to the address in the address field and the type value in the message type field.

For example, the local processor 114 may retrieve a message payload from the message body portion of the communication message designated for the local processor in response to the addressing module 410 determining that the type associated with the communication message is a "standard type" message and that the local processor is the destination for the communication message. Alternatively, the local processor 114 may retrieve a message payload from a designated sub-portion of a message body portion of the communication message in response to the addressing module determining that the type associated with the communication message is a "broadcast type." In such an embodiment, the designated sub-portion of the message body portion of the communication message is determined by the addressing module 410 in response to a value in the address field.

Alternatively, the local processor 114 may generate a message payload and inject the message payload into a designated sub-portion of the message body portion of the communication message in response to the addressing module 410 determining that the type associated with the communication message is a "poll type", wherein the designated sub-portion of the message body portion of the communication message is determined by the addressing module 410 in response to the address.

In a further embodiment, the transmitter module 402 may transmit the communication message with a default value in the designated sub-portion of the message body portion of the communication message in response to the addressing module determining that the type associated with the communication message is a "poll type," and in response to the local processor 114 failing to inject the message payload into the designated sub-portion of the message body portion of the communication message within a predetermined period of time.

Figure 5:
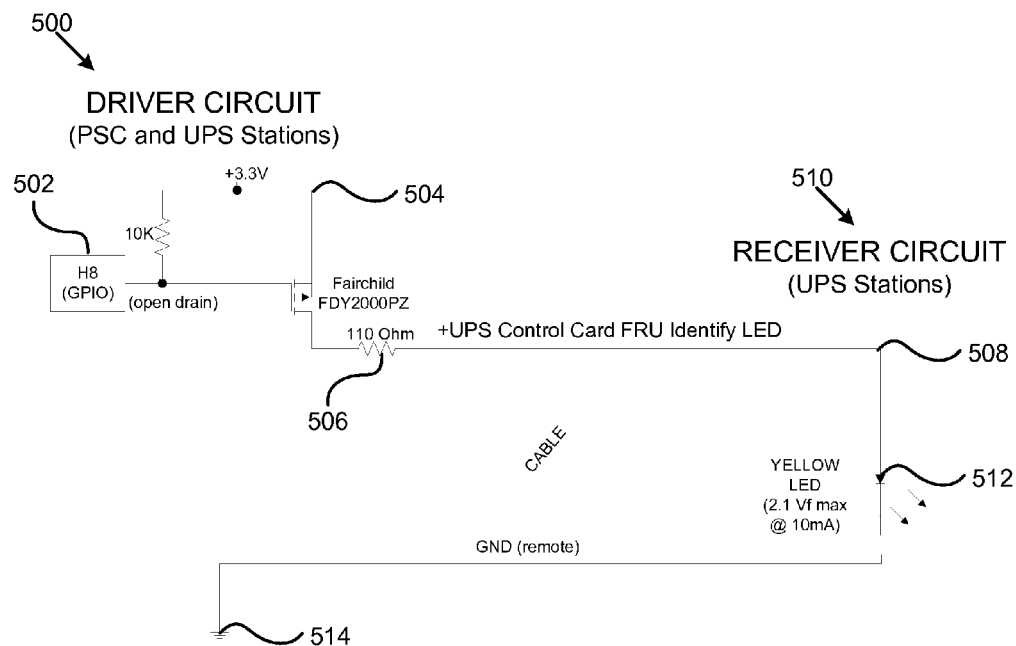
FIG. 5 is a schematic circuit diagram illustrating one embodiment of a communication circuit for communicating information between a PSC device and a UPS device.

FIG. 5 illustrates one embodiment of a circuit for communicating messages between hardware communication cards 112, 116. In one embodiment, the circuit includes a driver circuit 500 and a receiver circuit 510. The driver circuit 500 may be coupled to the receiver circuit 510 by an RS-485 cable 508.

In one embodiment, the driver circuit 500 includes a General Purpose Input/Output (GPIO) port 502. The GPIO port 502 may be coupled to a signal amplifier circuit 504. The signal amplifier circuit 504 may include a combination of resistors, capacitors, transistors, and the like configured to increase the transmit signal from the GPIO 502 to a predetermined power level. The driver circuit 500 may also include a line impedance balancing resistor 506. The transmit signal may be communicated from the driver circuit 500 to the receiver circuit over the cable 508. The receiver circuit may include a Light Emitting Diode (LED) 512 configured to convert a received voltage into a light pulse. In one particular embodiment, the LED 512 may be used in conjunction with a light detector (not shown) to improve the quality of a digital signal. The LED 512 may also connect to ground 514.

Figure 6:
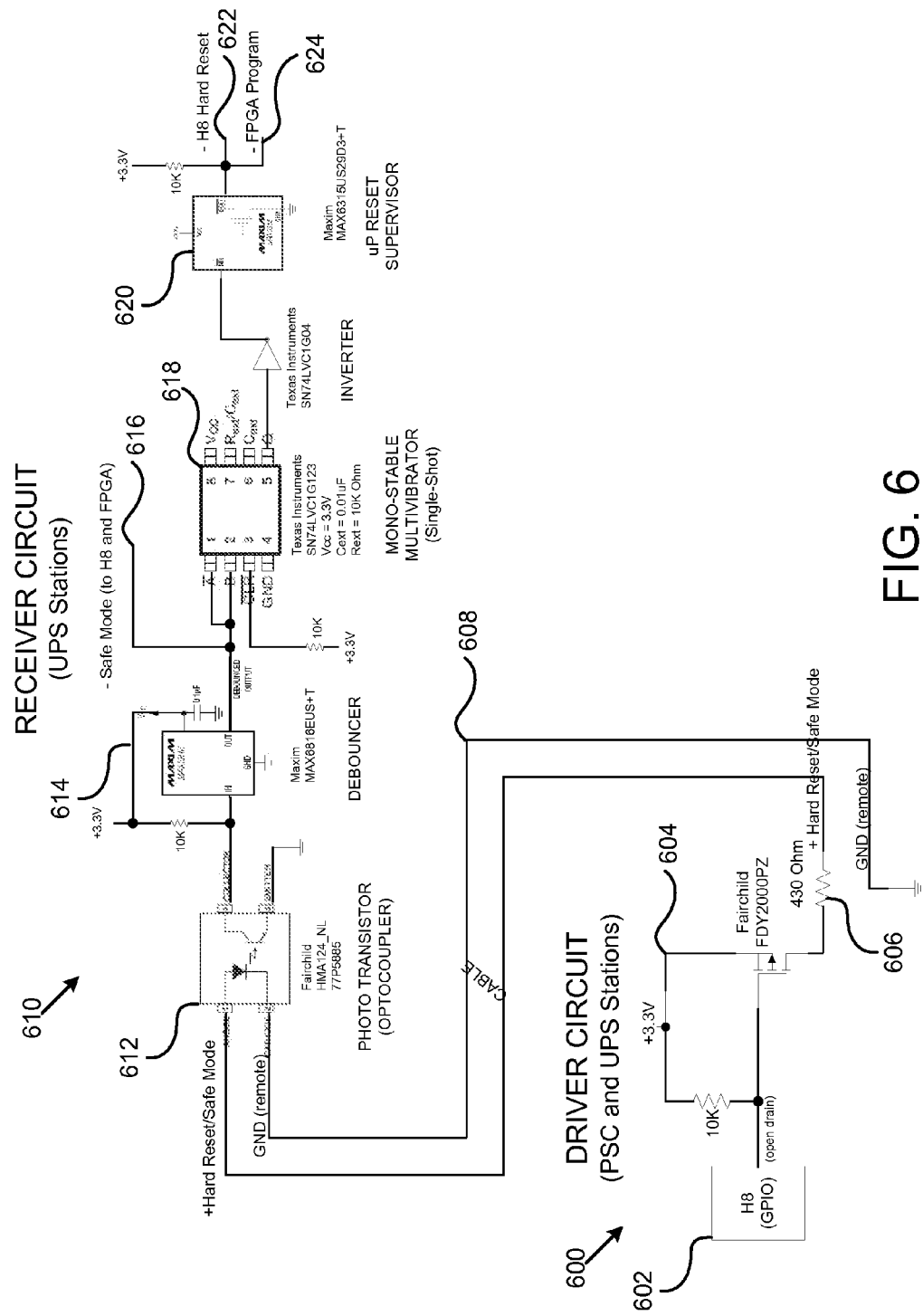
FIG. 6 is a schematic circuit diagram illustrating another embodiment of a communication circuit for communicating information between a PSC device and a UPS device.

FIG. 6 illustrates another embodiment of a communication circuit. This depicted embodiment may be implemented to communicate a "reset" or "safe mode" command. These commands may be transmitted on a separate communication line 608. In the depicted embodiment, the cable 608 connects a driver circuit 600 to a receiver circuit 610.

The driver circuit 600 may include a GPIO port 602, an amplifier circuit 604 and a line impedance matching resistor 606 as described above with relation to FIG. 5. The receiver circuit 610 may include an LED/photo receiver combination package. As described in FIG. 6, the combination package is an optocoupler 612. The optocoupler may improve the integrity of a digital signal transmitted on the line 608. The improved signal may include some electrical bounce, so the circuit may include a debouncer circuit 614. The debouncer circuit 614 may sufficiently debounce the signal to trigger the FPGA to operate in safe mode. Therefore, a safe mode line 616 may couple the signal to the FPGA and to the GPIO port 602 of the local device.

A single-shot mono-stable multivibrator 618 may be coupled to a reset port of the processing module 110, 114. The single-shot mono-stable multivibrator 618 may generate a reset pulse. The reset pulse may then be inverted and communicated to a microprocessor reset supervisor 620. The resulting signal may also be communicated to a local GPIO port 602 on a GPIO line 622 and to the FPGA on an FPGA communication line 624.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 7:
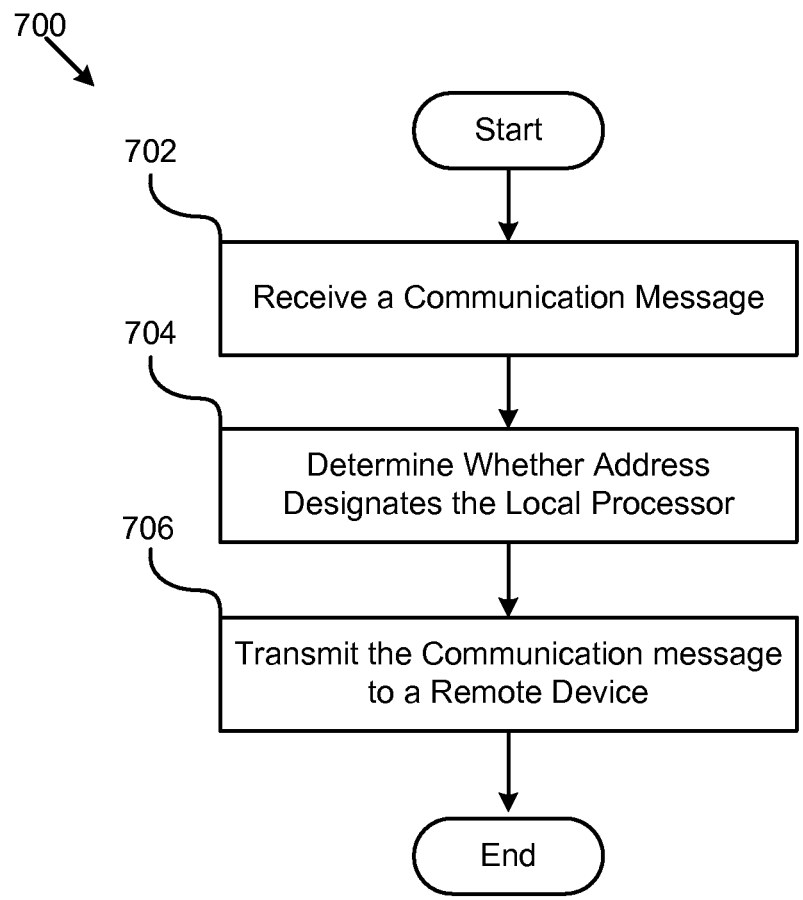
FIG. 7 is a schematic flow chart diagram illustrating one embodiment of a method for redundant device management.

FIG. 7 illustrates one embodiment of a method 700 for redundant device management. In one embodiment, the method 700 may start when receiver module 404 of a managed device 104 receives 702 a communication message from a remote device. For example, the first managed device 104 may receive a "poll type" message from the device manager 102. The addressing module 410 may then determined 704 whether the address value in an address field associated with the communication message designates the local processor 114 as the recipient of the communication message. In an alternative embodiment, the address value may designate the communication card 116 rather than the local processor 114. The transmitter module 402 may then transmit 706 the communication message to a remote device. For example, if the communication message is a downstream poll type message, the transmitter module 402 of the first managed device 104 may transmit 706 the communication message to the second managed device 106, and so on until the communication message reaches the Nth managed device 108.

Figure 8:
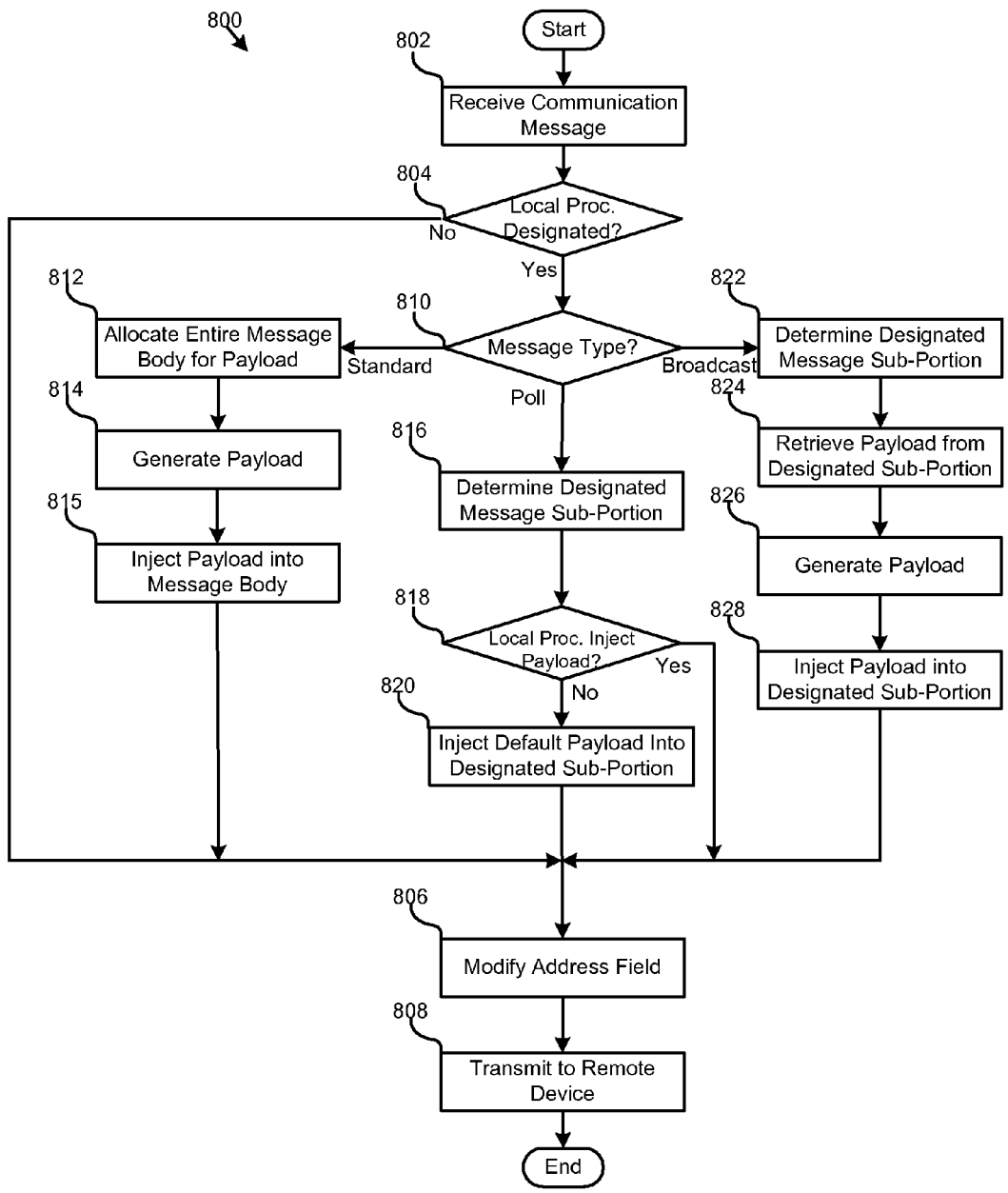
FIG. 8 is a detailed schematic flow chart diagram illustrating another embodiment of a method for redundant device management.

FIG. 8 illustrates an alternative embodiment of a method 800 for redundant device management. In the depicted embodiment, the method 800 starts when the receiver module 404 receives 802 a communication message. The addressing module 410 may then determine 804 whether the local processor 114 is designated as the recipient for the communication message payload. The addressing module 410 may also determine 810 the message type based on a value in a type field associated with the communication message.

If the addressing module 410 determines 810 that the communication message is a "standard type" message, then the entire message body may be designated 812 for the payload. The addressing module 410 may perform the allocation. The local processor 114 may retrieve a message payload from the message body, or inject a message payload into the message body. For example, the local processor 114 may generate 814 a response message payload and inject 815 the response message payload into the message body. For example, the local processor may communication the response message payload to a message buffer. Then, the transmitter module 402 may retrieve the message payload from the message buffer and place it in the message body when it generates the response message.

If the addressing module 410 determines 810 that the message is a "poll type" message, then the addressing module 410 may determine 816 the sub-portion of the message body designated for communication of payloads with the local processor 114. For example, the addressing module 410 may determine which sub-portion is designated for the local processor 114 based on an address value in the address field associated with the received communication message. If the local processor is active, it may inject a payload into the designated sub-portion of the message body. The transmitter module 402 may determine 818 if the local processor 114 has injected a message payload into the designated sub-portion. If the local processor 114 has not injected the payload, then the transmitter module 402 may inject 820 a default payload into the designated sub-portion.

If the addressing module 410 determines 810 that the message is a "broadcast type," then the addressing module 410 may determine 822 the sub-portion of the message body designated for communication of payloads with the local processor 114. The local processor 114 may then retrieve 824 a payload from the designated sub-portion. In a further embodiment, the local processor may generate 826 a payload for a response message. For instance, the local processor may generate 826 an acknowledgement payload. The local processor 114 may then inject 828 the payload into the designated sub-portion of the communication message.

In each of the three situations, the addressing module 410 may modify 806 the address field to designate a remote device. For example, the addressing module 410 may increment the value in the address field of a downstream communication message or decrement the value in the address field of an upstream communication message. Finally, the transmitter module 402 may transmit 808 the communication message to a remote device, and the method 800 ends. For example, the transmitter module 402 may transmit 808 the communication message to another managed device 104-108 in a chain of managed devices. Alternatively, the transmitter module may transmit 808 the communication message to the device manager 102.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
    a receiver module that receives a communication message at a managed device in a sequential chain of managed devices, the communication message comprising one of a plurality of message types, the chain of managed devices comprising a chain of Uninterruptible Power Supply (UPS) devices;
    a transmitter module that transmits the communication message to a remote device comprising a next device in the sequential chain of managed devices; and
    an addressing module, coupled to the receiver module and the transmitter module, that determines the message type of the communication message;
    the addressing module further determines whether an address associated with the communication message indicates a particular sub-portion of the communication message designated for a local processor as a destination in response to determining that the message type is a broadcast message type, the communication message comprising plurality of sub-portions, each managed device of the sequential chain of managed devices being designated a distinct sub-portion of the communication message, wherein each device in the sequential chain of managed devices receives and transmits the communication message intact with each sub-portion for the broadcast message type, wherein the address is stored in an address field associated with the communication message,
    wherein the local processor generates a message payload and injects the message payload into a designated sub-portion of a message body portion of the communication message in response to the addressing module determining that the message type associated with the communication message is a poll message type, wherein the designated sub-portion of the message body portion of the communication message is determined by the addressing module in response to the address,
    wherein all or a portion of the receiver module, the transmitter module, and the addressing module comprise one or more of logic hardware and executable code, the executable code stored on one or more computer readable storage media and executed by a processor.

2. The apparatus of claim 1, wherein the addressing module further determines the message type for the communication message received by the receiver module based on a type value in a message type field associated with the communication message.

3. The apparatus of claim 2, wherein the addressing module further determines the particular sub-portion of the communication message designated for the local processor in response to the address in the address field and the type value in the message type field.

4. The apparatus of claim 3, wherein the local processor further retrieves a message payload from the message body portion of the communication message designated for the local processor in response to the addressing module determining that the message type associated with the communication message is a standard message type and that the local processor is the destination for the communication message.

5. The apparatus of claim 3, wherein the local processor further retrieves a message payload from the particular sub-portion of the message body portion of the communication message in response to the addressing module determining that the message type associated with the communication message is the broadcast message type, wherein the particular sub-portion of the message body portion of the communication message is determined by the addressing module in response to the address.

6. The apparatus of claim 3, wherein the addressing module further modifies the address to designate an address value that designates the remote device in association with the transmitter module transmitting the communication message to the remote device.

7. The apparatus of claim 1, wherein the transmitter module transmits the communication message with a default value in the designated sub-portion of the message body portion of the communication message in response to the addressing module determining that the message type associated with the communication message is a poll message type, and in response to the local processor failing to inject the message payload into the designated sub-portion of the message body portion of the communication message within a predetermined period of time.

8. The apparatus of claim 1, wherein each managed device in the sequential chain of managed devices comprises an additional addressing module configured to pass at least a portion of the communication message to an additional local processor of each managed device, each managed device comprising an additional transmitter module configured to transmit the communication to a next device and each managed device comprising an additional receiver module configured to receive the communication message, wherein each managed device receives at least a portion of the communication message.

9. A system, comprising:
    a sequential chain of managed devices comprising one or more managed devices, the managed devices comprising:
    a first receiver module that receives a communication message at a particular managed device in the sequential chain of managed devices, the communication message comprising one of a plurality of message types, the chain of managed devices comprising a chain of Uninterruptible Power Supply (UPS) devices;
    a first transmitter module that transmits the communication message to a remote device comprising a next device in the sequential chain of managed devices, the first transmitter module transmitting a response message to a preceding device; and
    an addressing module, coupled to the first receiver module and the first transmitter module, that determines the message type of the communication message;
    the addressing module further determines whether an address associated with the communication message indicates a particular sub-portion of the communication message designated for a local processor as a destination in response to determining that the message type is a broadcast message type, the communication message comprising plurality of sub-portions, each managed device of the sequential chain of managed devices being designated a distinct sub-portion of the communication message, wherein each device in the sequential chain of managed devices receives and transmits the communication message intact with each sub-portion for the broadcast message type, wherein the address is stored in an address field associated with the communication message, wherein the local processor generates a message payload and injects the message payload into a designated sub-portion of a message body portion of the communication message in response to the addressing module determining that the message type associated with the communication message is a poll message type, wherein the designated sub-portion of the message body portion of the communication message is determined by the addressing module in response to the address; and one or more device managers, comprising:
a second transmitter module that transmits the communication message to a first managed device in the chain of one or more managed devices;
a second receiver module that receives the response message from the first managed device; and
a processing module, in communication with the second transmitter module and the second receiver module, that generates the communication message and to process the response message, wherein the communication message and the response message further comprise an address field, wherein a value of the address field associates a portion of the communication message with the managed device, and wherein the value of the address field associates a portion of the response message with the managed device.

10. The system of claim 9, wherein the addressing module further determines the message type for the communication message received by the first receiver module based on a type value in a message type field associated with the communication message.

11. The system of claim 10, wherein the addressing module further determines the particular sub-portion of the communication message designated for the local processor in response to the address in the address field and the type value in the message type field.

12. The system of claim 11, wherein the local processor further retrieves a message payload from a message body portion of the communication message designated for the local processor in response to the addressing module determining that the type associated with the communication message is a standard message type and that the local processor is the destination for the communication message.

13. The system of claim 11, wherein the local processor further retrieves a message payload from the particular sub-portion of a message body portion of the communication message in response to the addressing module determining that the type associated with the communication message is the broadcast message type, wherein the particular sub-portion of the message body portion of the communication message is determined by the addressing module in response to the address.

14. The system of claim 9, wherein the first transmitter module transmits the communication message with a default value in the designated sub-portion of the message body portion of the communication message in response to the addressing module determining that the type associated with the communication message is a poll message type, and in response to the local processor failing to inject the message payload into the designated sub-portion of the message body portion of the communication message within a predetermined period of time.

15. A method, comprising:
receiving a communication message at a managed device in a chain of managed devices, the communication message comprising a type value in a message type field, the type value indicating a message type of the communication message, the message type comprising one of a poll message type, a broadcast message type, and a standard message type, the chain of managed devices comprising a chain of Uninterruptible Power Supply (UPS) devices;
determining the message type of the communication message;
determining whether a particular sub-portion of the communication message is designated for a local processor based on an address associated with the communication message and the type value in the message type field in response to determining that the message type is a broadcast message type, the communication message comprising plurality of sub-portions, each managed device of the sequential chain of managed devices being designated a distinct sub-portion of the communication message, wherein each device in the sequential chain of managed devices receives and transmits the communication message intact with each sub-portion, wherein the address is stored in an address field associated with the communication message;
generating a message payload;
injecting the message payload into a designated sub-portion of the message body portion of the communication message in response to a determination that the message type associated with the communication message is the poll message type, wherein the designated sub-portion of the message body portion of the communication message is determined by in response to the address; and
transmitting the communication message to a remote device comprising a next device in sequence in the sequential chain of managed devices.

16. The method of claim 15, wherein the type is determined based on the type value in the message type field.

17. The method of claim 15, wherein the method further comprises retrieving a message payload from a message body portion of the communication message designated for the local processor in response to a determination that the message type associated with the communication message is the standard message type and that the local processor is the destination for the communication message.

18. The method of claim 15, wherein the method further comprises retrieving a message payload from the particular sub-portion of a message body portion of the communication message in response to a determination that the message type associated with the communication message is the broadcast message type, wherein the particular sub-portion of the message body portion of the communication message is determined in response to the address.

19. The method of claim 15, wherein the method further comprises transmitting the communication message with a default value in the designated sub-portion of the message body portion of the communication message in response to a determination that the message type associated with the communication message is the poll message type, and in response to the local processor failing to inject the message payload into the designated sub-portion of the message body portion of the communication message within a predetermined period of time.

20. The method of claim 15, wherein the method further comprises modifying the address to designate an address value that designates the remote device in association with transmission of the communication message to the remote device.

* * * * *